United States Patent
Rol Corredor et al.

(10) Patent No.: US 9,512,598 B2
(45) Date of Patent: Dec. 6, 2016

(54) DEVICE FOR DETACHABLE FASTENING OF TWO MECHANICAL COMPONENTS

(75) Inventors: Javier Rol Corredor, St. Adria del Besos (ES); Javier Jimenez García, Mataro (ES); Francisco Pérez Soria, Premia de Mar (ES); Jorge Triginer Boixeda, Barcelona (ES); Ester Alonso Frigola, Celra (ES)

(73) Assignee: METALOGENIA, S.A., Premia de Mar (ES)

(*) Notice: Subject to any disclaimer, the term of this patent is extended or adjusted under 35 U.S.C. 154(b) by 550 days.

(21) Appl. No.: 14/111,829

(22) PCT Filed: Apr. 15, 2011

(86) PCT No.: PCT/ES2011/070277
§ 371 (c)(1),
(2), (4) Date: Dec. 26, 2013

(87) PCT Pub. No.: WO2012/140286
PCT Pub. Date: Oct. 18, 2012

(65) Prior Publication Data
US 2014/0133905 A1    May 15, 2014

(51) Int. Cl.
*E02F 9/28*  (2006.01)
*F16B 3/00*  (2006.01)

(52) U.S. Cl.
CPC ........... *E02F 9/2833* (2013.01); *E02F 9/2841* (2013.01); *F16B 3/00* (2013.01); *Y10T 403/7075* (2015.01)

(58) Field of Classification Search
CPC ......... E02F 9/2833; E02F 9/2841; F16B 3/00; F16B 3/04; F16B 2019/006; F16B 21/06; F16B 21/065; F16B 21/08; F16B 21/18; Y10T 403/7075; Y10T 403/75; Y10T 403/7018; Y10T 403/587; Y10T 403/553; Y10T 403/32508; Y10T 403/7083; Y10T 403/7079; Y10T 403/7091; Y10T 24/4501
See application file for complete search history.

(56) References Cited

U.S. PATENT DOCUMENTS

| | | | | |
|---|---|---|---|---|
| 2,994,141 A | * | 8/1961 | Stephenson | E02F 9/2841 37/456 |
| 3,223,452 A | * | 12/1965 | Krekeler | E21C 35/19 299/109 |
| 3,368,293 A | | 2/1968 | Judkins et al. | |

(Continued)

FOREIGN PATENT DOCUMENTS

WO   2010/089432 A1   8/2010

OTHER PUBLICATIONS

International Search Report of PCT/ES2011/070277, dated Jan. 13, 2012.

*Primary Examiner* — Matthieu Setliff
(74) *Attorney, Agent, or Firm* — Sughrue Mion, PLLC (57) ABSTRACT

Device for detachable fastening of two mechanical components between which a channel or housing is defined, including a peg, with at least two grooves on opposite faces, and a band accommodated in the grooves, fastened by pinching at the lower part of the peg and with a flexible portion that has the upper end thereof bent in order to retain the peg/band assembly in a transverse grove of the channel The invention applies in particular to the fastening of a tooth in a tooth holder of the scoop of an excavating machine or the like.

18 Claims, 5 Drawing Sheets

(56) References Cited

U.S. PATENT DOCUMENTS

| | | | |
|---|---|---|---|
| 3,832,077 A | | 8/1974 | Von Mehren |
| 4,187,035 A | * | 2/1980 | Colburn ................ E02F 9/2841 37/458 |
| 5,074,062 A | | 12/1991 | Hahn et al. |
| 5,233,770 A | | 8/1993 | Robinson |
| 5,724,756 A | | 3/1998 | Gale |

* cited by examiner

DEVICE FOR DETACHABLE FASTENING OF TWO MECHANICAL COMPONENTS

CROSS REFERENCE TO RELATED APPLICATIONS

This application is a National Stage of International Application No. PCT/ES2011/070277, filed on Apr. 15, 2011, the contents of all of which are incorporated herein by reference in their entirety.

The present invention refers to a device for detachable fastening of two mechanical components, one female component and one male component, preferably for guaranteeing the fastening between a wear element and an adaptor element, used in excavator machinery and similar. Said fastening device comprises a peg, which blocks the wear element (tooth) in a detachable way with the adaptor element (the tooth holder) and a retainer element linked to the peg, which works alongside the same to prevent the peg from coming out of its blocking position, thus maintaining the fastening between the two mechanical components.

The device, object of the present invention, is to be applied especially within the public works sector, for example excavations and mining, although it may also be used in other sectors which require two components to be fastened together, one being a male component and the other a female component, which are joined together.

BACKGROUND OF THE INVENTION

Excavation machines and similar, such as those used in public works and mining, are used to extract, move and load earth and rocks. These machines usually have a scoop joined to a mechanical arm. The scoop has a blade or a bevelled lip at the front edge, designed to impact and penetrate the mass of earth and rocks. In order to prevent excessive wear in the blade and to help to penetrate the earth, a number of teeth linked to the blade are usually mounted, which protrude from the front edge of the same. However, said teeth are also subjected to wear and breakage and should therefore be replaced frequently. Furthermore, depending on the work to be carried out by the machine, one may wish to change the type or shape of the teeth. In order to facilitate this replacement, a tooth holder is used, which is fastened to the blade of the scoop in a more or less permanent way, as well as a number of teeth, in such a way that each tooth is mounted freely in the tooth holder by means of a peg. Usually, this peg crosses a number of openings in the tooth and a passage that crosses the tooth holder, with the aim of fastening the tooth to the tooth holder, thus guaranteeing the connection between them.

When the sets of teeth and the tooth holder operate in difficult conditions, the peg that joins them together tends to move against the push force of a retention device or retainer element, which works with the peg to keep the tooth and the tooth holder together. Therefore, the peg may come out of the tooth holder and both the peg and the tooth could become lost. The loss of a tooth and/or peg may be very significant depending on the area in which work was being carried out with the same and may lead to other machines getting damaged, for example breakers, which work in the same production area as the machine using the teeth, for example in mines or quarries. As already indicated, a retention device linked to the peg is used to prevent the peg from coming out of its mounting position between the tooth and the tooth holder, which fastens the peg into said mounting position. The fastening devices, formed by at least one peg and at least one retainer element, usually have elastic characteristics, attributed to the fastening device by the retainer, so that the peg may be fastened and freed without it being necessary to break the same, this being a simple and preferably, hammerless process, i.e. without it being necessary to use a hammer.

Retention devices or elements made of elastic material, such as rubber or polyurethane, are usually used, given that they have elastic characteristics which facilitate the creation of a system which is easy to dismount, without having to apply a high level of force. These retention elements are not useful for all kinds of work, owing to the fact that when they are used in applications in which the temperature of the material is high, the elastic material used may melt and/or lose its elastic qualities, therefore failing to retain the peg, which could also give rise to the peg and/or tooth getting lost.

U.S. Pat. No. 5,233,770 describes a peg system formed by an elongated body with a proximal end and a distal end. The proximal end serves as an impact surface, whilst the distal end serves to guide the introduction of the peg into the coupling or mounting formed by the two components. Likewise, this peg has a stopper element, which extends towards the outside of the main body, this limiting the course for inserting the peg, so that the same does not exceed its mounting position. Furthermore, the peg has a built-in spring at a certain angle, which may be compressed when inserting the peg but which recovers its usual position in the mounting position. This peg system is very rigid and the force needed to introduce and above all, extract this kind of peg is very high, i.e. a mallet or hammer is needed to extract the peg and to make it possible to uncouple the male and female components, given that it is necessary to apply considerable force in order to break the stopper element.

The fastening system described in U.S. document number U.S. Pat. No. 5,724,756 has a spring system for fastening the rear cavity of a hunt tooth to the mounting flange of an adaptor. Said fastening system is not very reliable or stable, given that both whilst introducing the same as well as when the same is in operation, it tends to move in an uncontrolled manner, which could jam the system mid extraction as well as lead to the loss of the elastic properties, which are claimed to create tension in the system, thus giving rise to the loss of this function. Furthermore, this retention system requires an additional retention system so that the peg body does not move from its mounting position.

DESCRIPTION OF THE INVENTION

With the aim of overcoming the abovementioned limitations and simplifying the mounting and dismounting of a wear element or tooth, in an adaptor element or tooth holder, specifically of the variety which form in its coupling placement a channel or cavity between them in order to introduce or locate the fastening device and thereby fasten the wear element in the adaptor element, the object of the present invention is a fastening device, according to that contained in claim 1.

The fastening device according to the present invention comprises a peg formed by a body, which is preferably an elongated prism shape and a retainer element formed by a band, that work together in order to allow the band to flex, thereby facilitating easy mounting, dismounting and retention of the fastening device in a coupling formed by a male piece and a female piece, preferably a wear element and an adaptor element and more preferably a tooth and a tooth holder.

The peg has a preferably elongated body with at least two grooves on opposite faces, located on opposite sides of the peg. A first groove preferably runs along the entire length of the peg from its upper end, having a variable depth, with a first portion of decreasing depth, until it reaches a second portion of constant depth, which extends to the lower end of the peg. The first portion of decreasing depth may be located in the middle of the peg body. The second groove, located on the opposite side to the first groove of the peg, may also run longitudinally in the peg body. A preferred formation of this second groove has a cavity, which is deeper than the second groove.

The main body of the peg may be formed in any way externally, provided that it has two grooves on opposite faces located on opposite sides of the peg body or in other words, which are separated by the same peg body. As already indicated, the peg body has at least two grooves, although it may have four, which join said first and second groove along the length of the perimeter of the peg body. In a first portion, the first groove decreases in depth, in such a way that, preferably from the upper end at which there is maximum depth, the depth decreases along the length of a first portion until it becomes constant in a second portion, until it reaches the lower end of the peg body.

In the second groove, the depth may increase or may be constant, it being preferable that is also increases and more preferable that it increases constantly but more abruptly that in the first groove, therefore defining a cavity in which the fastening end of the band will be located, defining a thickness or certain distance between grooves, "X".

This constant depth in the first portion is preferably also maintained in the event of the lower end of the peg having a third portion, which joins the first and second grooves together, said third groove describing an arch or approximately 180°.

Likewise, the retainer element is formed by a band inserted into the grooves on opposite sides of the peg, in such a way that said band has a longitudinal bending portion, which is positioned in the first groove of the peg and which comes into contact with the groove in its constant depth portion and loses contact in the decreasing depth portion. Said band has a first free retention end at an angle from the longitudinal bending portion of the band and a fastening portion which is positioned in the second groove of the peg, with a second free end, opposite to the first free end.

The section of said band is preferably round but other section formations are possible, for example rectangular.

The band has a first portion or retention end, a second straight portion or bending portion and a third portion or fastening end, which fastens the band to the peg body.

The first portion or retention end of the band is straight/flat in shape, forming an angle of between 0° and 90°, preferably 90°, with the second portion or bending portion, the direction of this first portion being opposite to the peg body, thus meaning that when the band is mounted on the peg body, this retention end has the characteristic of protruding from the peg body. This second portion or bending portion is preferably longer in length than the retention end. Its direction approximately coincides with the central axle of the peg.

At the end of the bending portion, the fourth portion or curved portion begins, formed by a curved part at preferably 180°, which causes the band to take on an S shape. This fourth portion of the band shall be inserted into the third groove of the peg in the event of the same said groove connecting the first and second groove.

After turning, there is a final straight portion or fastening portion, which is housed in the second groove of the peg body or preferably in the cavity of the second groove of the peg body. The greater depth of said cavity in the second groove means that the fastening end is fixed more deeply in the peg, thus creating an contact area or surface, which prevents the peg from moving when it tends to come out upon being subjected to forces as the machine is in operation, which tends to expel the peg from the fastening device.

The distance between the first and second grooves of the peg, x, measured horizontally, especially between one point on the second portion, the constant depth portion, of the first groove and the second groove at its deepest point, also determines the minimum thickness of the peg body between the grooves. Said distance is greater than the shortest of the distances, x1, measured horizontally, being between the bending portion of the band and the fastening portion of the band when the band is not inserted into said grooves. The latter implies that it is necessary to apply force in order to separate the two portions of the band and insert it into the two grooves of the peg in order to create a pinch effect, which prevents the peg from becoming separated from the band or vice versa.

Therefore, when mounting the band in the grooves of the peg, the bending portion of the band is located in the constant depth portion of the first groove of the peg and the fastening portion is preferably located in the cavity of the second groove. Owing to the fact that the distance x1 is less than x, it is necessary to be precise in order to open the band gently and in order for it to be coupled to or introduced into the grooves of the peg body, creating a pinch effect, where the pressure of said effect is responsible for the band being held tight around the peg, without the risk of them becoming separated.

The band should be made from a material with a high level of elasticity, which enables flexibility in the same when it is submitted to certain forces. For example, the band may be of the tempered steel variety employed in the manufacture of springs.

In order for the detachable fastening device to be mounted between a wear element or tooth and an adaptor element or tooth holder, the wear element must firstly be mounted in the adaptor element, in such a way that, in this position, the aperture of the adaptor element for the fastening device is aligned with the aperture of the wear element for said fastening device, thus creating a channel in which the fastening device will be placed, in order to jam or prevent the wear element from coming out, thus preventing the same from coming out of its mounting position.

The two elements, the peg and the retainer element, of the fastening device are mounted before delivering the component to the client, thus determining the existence of a unique reference for the retainer device. The band is mounted to the peg. Once the band has been mounted to the peg body, part of the bending portion loses contact with the first end of the first groove of the peg, which is deeper and decreases in depth. The first groove area of the peg, in which no contact is established with the band, is the free space that needs the bending and flexible portion of the band to be able to move from a mounting position to a dismounting position.

The fastening device is subsequently introduced into the channel of the wear/adaptor element assembly. The channel has a number of measures similar to the peg body, which I why, upon introducing the fastening element into the channel, the retainer end of the band, which protrudes from the peg body, interferes with the channel formed by the adaptor and the wear element. This interference with the channel pushes the band towards the free space or no contact space of the first groove of the peg, thus allowing the fastening device to slide along the channel from the wear/adaptor element assembly.

The fastening element is introduced into the cannel, with the band being compressed, until the retention end of the band reaches a groove inside the channel, which enables, given that this groove deeper than the width of the channel, the retention end of the band to be freed of the compression pressure, returning to its relaxed position, thereby fastening the fastening device in its mounting position.

Given these characteristics, both the mounting of the wear element and the dismounting operation are carried out in a simple way without it being necessary to hit the fastening device hard, which could give rise to dangerous situations. At the same time, however, the coupling is solid and reliable during work. This is possible, not only given the way in which it is constructed but also because that the dirty conditions the device is subjected to during work does not affect the operation of the same, given that the dirt does not interfere with the movement of the band.

In order to dismount the fastening device, the upper part of the peg is tapped gently until the retention end of the retention element or band is freed from the adapter groove. Since the peg preferably has a wedge shaped section, the same is freed easily from the adaptor channel and the device can be removed from the interference between the wear element and the adaptor, making it possible to remove the wear element and replace it with another one easily.

The fact that it is easy to mount and dismount the wear elements without having to apply great force makes it possible to mount a greater number of wear elements in the machine's bucket without having to go to the workshop, i.e. this task may be carried out on site.

One characteristic of the present retention device is that it can be adapted to existing retention systems.

BRIEF DESCRIPTION OF THE DRAWINGS

In order to facilitate a better understanding of that set out above, below is a set of drawings which provide a schematic, non-limiting example of the various practical embodiments of the present invention.

FIG. 14a is a side view of an alternative band that forms part of a fastening device.

FIG. 14b is a side view of an alternative band that forms part of a fastening device.

DESCRIPTION OF PREFERRED EMBODIMENTS

Figure 1:
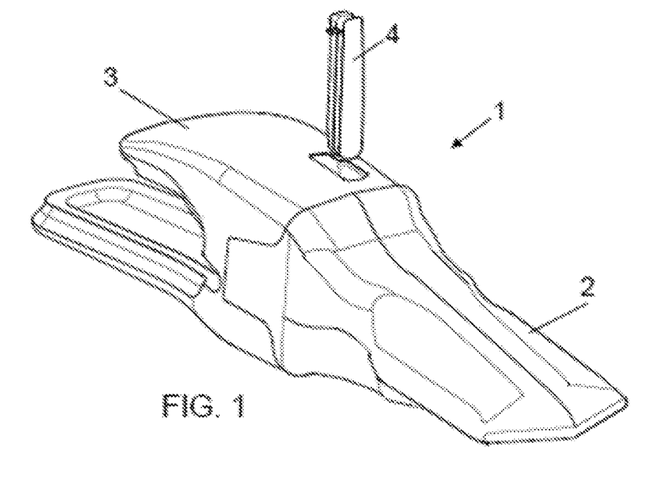
FIG. 1 is a front perspective view of an assembly formed by a tooth and a tooth holder with a fastening device, object of the present invention, before being introduced into the assembly.
Figure 2:
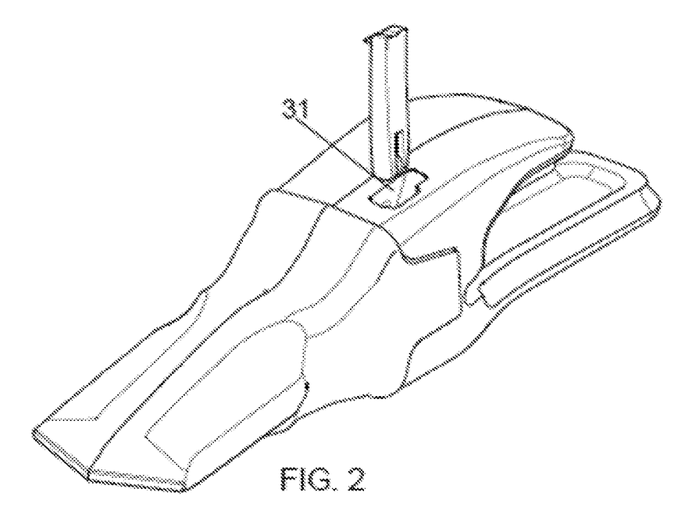
FIG. 2 is a rear perspective view of FIG. 1.
Figure 3:
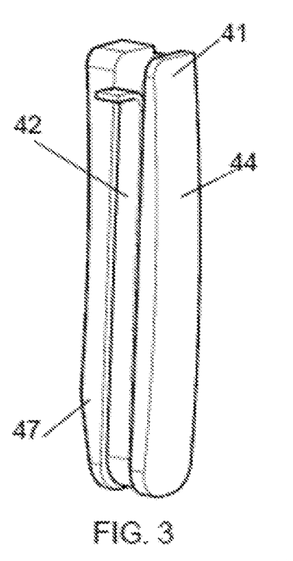
FIG. 3 is a front perspective view of a fastening device, object of the present invention.
Figures 4, 5:
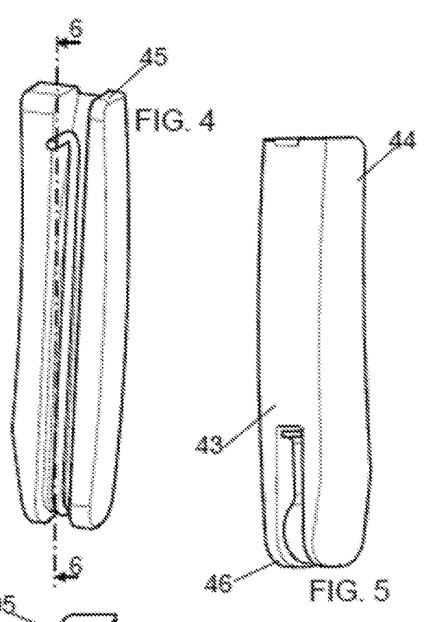
FIG. 4 is a front perspective view of an alternative fastening device, object of the present invention.
FIG. 5 is a rear perspective view of the fastening device, shown in FIG. 3.
Figure 6:
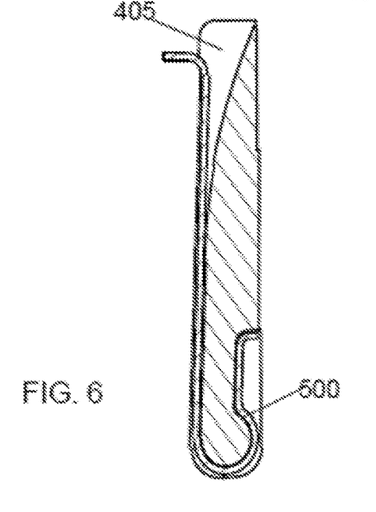
FIG. 6 is a longitudinal section of the fastening device shown in FIGS. 3 and 4.
Figure 7:
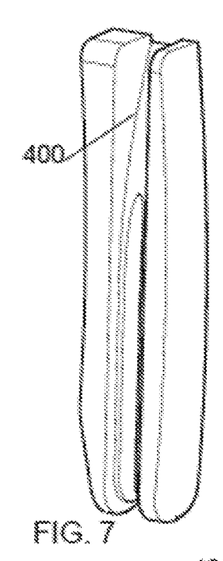
FIG. 7 is a perspective view of a peg that forms part of a fastening device.
Figure 8:
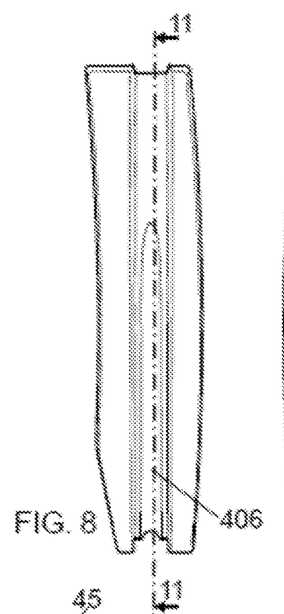
FIG. 8 is a front view of a peg that forms part of a fastening device.
Figure 9:
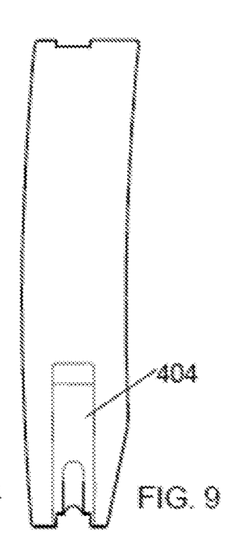
FIG. 9 is a rear view of a peg that forms part of a fastening device.
Figure 10:
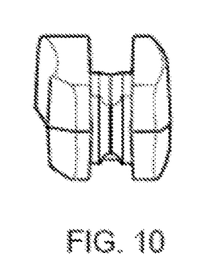
FIG. 10 is an upper view of a peg that forms part of a fastening device.
Figure 11:
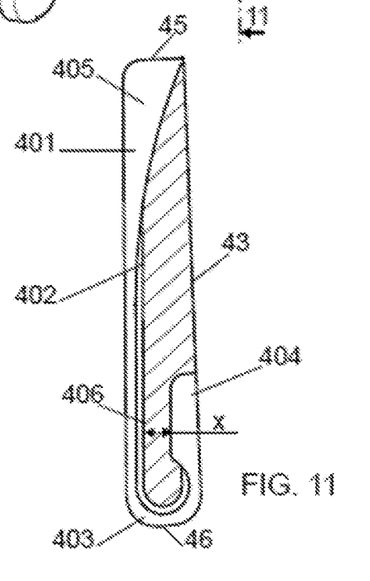
FIG. 11 is a longitudinal section of a peg taken from FIG. 8 that forms part of a fastening device.
Figure 12:
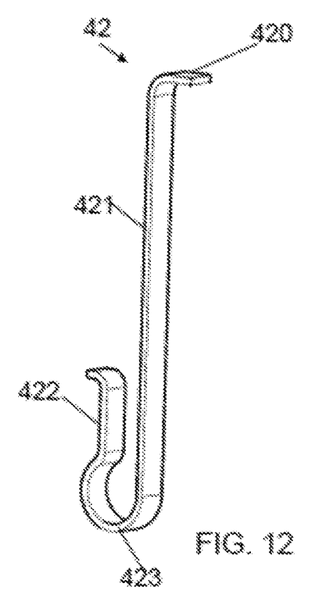
FIG. 12 is a perspective view of a band that forms part of a fastening device.
Figures 13, 14:
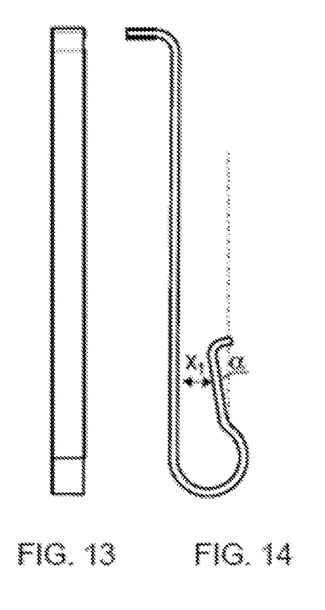
FIG. 13 is a front view of a band that forms part of a fastening device.
FIG. 14 is a side view of a band that forms part of a fastening device.
Figure 14:
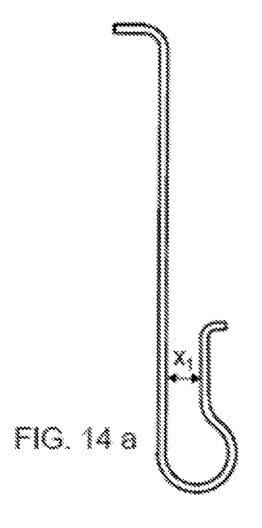
Figure 15:
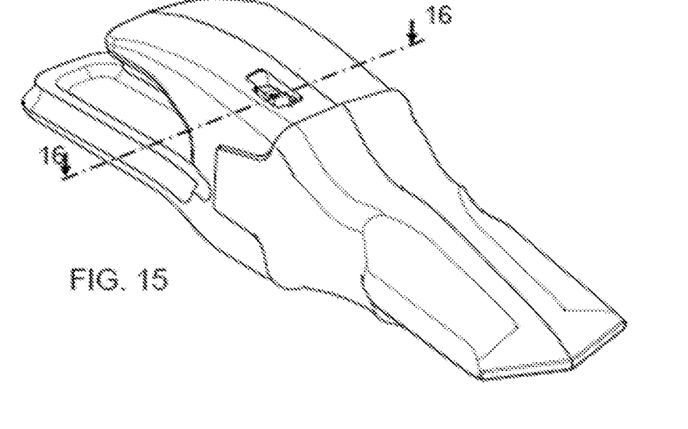
FIG. 15 is a front perspective view of an assembly formed by a tooth and a tooth holder with a fastening device inserted.
Figure 16:
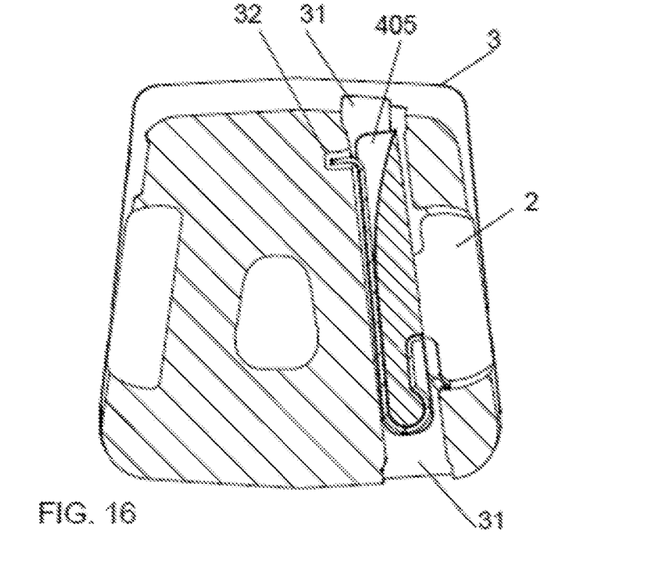
FIG. 16 is a cross-section taken from FIG. 15 of the channel defined by mounting a tooth and tooth holder with a fastening device inserted.

The description of the preferred form of embodiment of the present invention refers, by way of example, to the coupling between a tooth and a tooth holder of a bucket in an excavator machine or similar, although it is clear that the fastening device, object of the present invention, may be used to detachably fasten other types of mechanical components.

With reference to the figures attached, a tooth-tooth holder coupling (1) comprises a tooth (2), a tooth holder (3) and a fastening device (4), object of the present invention, formed by a peg (41) and a retainer element or band (42), fitted onto said peg (41).

In the preferred embodiment shown, the elongated prismatic body of the peg has various faces, a front face (47) and a rear face (43). Likewise, it has two side faces (44), an upper face (45) and a lower face (46). The upper and lower faces (45, 46) are preferably smaller in section than the front (42), rear (43) and side (44) faces.

Likewise, the peg body (41) has a first groove (400) of variable depth. In a first portion (401), said groove decreases in depth from the upper end of the peg, coinciding with the upper face (45) where depth is at its maximum and depth decreases until a constant depth portion (402) is reached in the front face (47).

The peg (41) has a second groove on the rear face of the peg (43), which preferably increases in depth, thus delimiting a cavity (404), where the second groove of the peg ends its course. The bottom of this rear cavity (404) determines a thickness or distance, "x", with the constant depth portion (402) of the groove (400) on the front face of the peg.

This rear cavity (404) may preferably have a flat and/or parallel surface relative to the first portion of the first constant depth groove however other formations are possible, it being possible for it to be curved in shape or flat with a certain degree of inclination. The band (42) has a fastening portion designed to be housed in the rear cavity (404) of the peg. Likewise, said straight fastening portion may be inclined relative to the bending portion (421) at a certain angle a. Said portion may also be curved or comprise a curve.

In the peg shown in the figures, the anterior grooves are joined by the lower face (56) of the peg (41), thus delimiting one single groove in the peg (41). In the same, the constant depth portion (402) of the groove on the front face (47) is maintained in a lower constant portion (403) on the lower face (46), in such a way that the groove curves at 180°, following the lower face (46) until it reaches the rear face (43) of the peg (41).

Likewise, the fixing device (4) has a built in retainer element or band (42), which has a first retention portion or end (420), a second straight or bending portion (421), a third end fastening portion (422) and a final or curved portion (423), in which the band changes direction and which joins the bending portion (421) to the fastening portion (422).

The first retention portion or end (420) of the band (42) is straight/flat in shape, forming an angle of preferably 90°, although this may vary between 0° and 90°, with the second portion or bending portion (421). The direction of this first portion is opposite to the peg (41) of the fastening device, which is why when the band (42) is fitted into or coupled to the peg (41), this retention end (420) has the characteristic of protruding from the peg (41) of the fastening device (4), once the band (42) has been mounted to the peg (41). The second portion or bending portion (421) of the band (42) is preferably longer in length than the retention end (420).

At the end of the second portion or bending portion (421), a fourth portion or curved portion (423) begins, from which there is the fastening portion (422), the geometry of which preferably complements the cavity/geometry of the cavity (404) of the second groove of the peg, i.e. the fastening end (422), following the depth of the cavity (404) of the second groove of the peg, touches the inside of the peg, thereby creating an opposition area or surface. The cavity (404) of the peg and the fastening end (422) of the band (42) working together serves to prevent the peg from travelling upwards when the system is in operation and tends to remove the body from its mounting position.

The curved portion (423) follows the curved portion of the groove located on the lower face (46) of the peg body (41), thus forming a 180° curve.

As already indicated, after the curved portion (423), a fastening curve (422) is located, which has a distance Xi with the bending curve (421), this distance being shorter than the distance X of the peg. This fastening portion (422) has a first function which is to fasten or retain the band (42) in the peg and given that the distance x1 is less than the distance x, it is necessary to apply a certain amount of pressure on the band (42), in order to open it gently and for the same to be introduced into the opening of the peg (41), just like a pinch effect. This pinch effect causes the band (42) to be kept tensed in the peg (41), ensuring its position without the risk of it getting lost.

In addition, the first portion of the first groove (402) may include a recess or additional groove (406) for fastening the band (42) into position relative to said first groove (402) and by proxy, relative to the peg (41). Said recess may also be extended to the second groove (404) and third groove (403).

In order for the detachable fastening system (4) to be mounted between a wear element or tooth (2) and an adapter element or peg (3), the wear element (2) is firstly coupled to the adapter element (3) and in this position, the housing or channel of the adapter element (3) for the peg (41) is aligned with the opening in the wear element (2) for the peg (41), thus creating a housing or channel (31) in which the fastening element (4) is accommodated, ensuring the coupling between the wear element (2) and the adaptor element (3) and thereby preventing the fastening device (4) from coming out of its mounting position.

When the band (42) is mounted to the peg body (41), the band (42) comes into contact with the constant depth portion (402) of the groove (400) of the peg (41), thus resulting in the band (42) losing contact with the groove (400) in the decreasing depth portion (401). In the area in which no contact is established with the band (42), there is a free space (405), which is the space the flexible portion (421) of the band (42) needs to be moved from a mounting position to a dismounting position.

The fastening device (4) is subsequently introduced into the channel or housing (31) of the assembly formed by the wear element/adaptor element (1), which have previously been coupled. The channel (31) has a number of means similar to the peg body (41), which is why when the fastening element (4) is introduced into the channel (31), the retainer end (420) of the band (42) protrudes from the peg body (41), interfering with the adapter (3). This interference with the adapter element (3) pushes the band (42) towards the free space (405) of the groove (31), thus enabling the fastening device (4) to slide along the channel (31) of the wear (2)—adapter (3) element assembly.

The fastening device (4) is introduced into the channel (31), with the band (42) being compressed, until the retention end (420) of the band (42) reaches a groove (32) inside the channel (31) of the wear/adapter element assembly (1), this groove (32) which is deeper than the width of the channel (31) enabling the fastening end (420) of the band (42) to be freed from the compression pressure, the band thereby returning to its relaxed position and consequently fastening the fastening device (4) in mounting position.

Owing to these characteristics, both mounting the wear element (2) and dismounting are easy processes which do not require great force to be applied which may be dangerous. At the same time, it ensures solid and reliable fastening throughout work. This is possible, not only given the way in which it is instructed but also because the dirty conditions which the device is subjected to during work do not affect the operation of the same given that dirt does not interfere in the band moving.

For dismounting, the upper part of the peg body (41) is tapped gently, via its upper face (54) until the retention end (420) is freed from the groove (32) of the channel. Owing to the fact that the peg (41) is preferably wedge shape, the same is freed easily from the channel (31), the fastening device coming out of the coupling/interference position between the wear element (2) and the adaptor (3). Once the fastening device (4) has been freed from the coupling position, the wear element may be withdrawn and replaced with another one. The ease of mounting and dismounting make it possible for this task to be carried out on site, without it being necessary to take the machine to the workshop.

An additional characteristic of the present retention device is that it may be adapted to existing retention systems.

The present invention has been described with reference to various specific embodiments; however an expert in the field would be able to combine the various embodiments depending on application needs and introduce variations and substitute some elements for other, technically equivalent elements, which would also fall within the scope of protection defined by the claims attached.

The invention claimed is:

1. A fastening device for coupling a male piece and a female piece, the coupling forming a channel or housing in which the fastening device is housed, the fastening device comprises:
   a peg formed by a solid body with an upper end and a lower end and a first groove on one side of the peg and a second groove on an opposite side of the peg and opposite the first groove, wherein the first groove is variable in depth and runs longitudinally along the peg body, the first groove comprising a first upper portion which decreases in depth followed by a second lower portion of constant depth that extends until the lower end of the peg body and;

a retainer element, which comprises a band inserted into the first groove and the second groove of the peg, the band having a longitudinal bending portion in the first groove of the peg, the longitudinal bending portion configured to bend within the first upper portion of the first groove; the retainer element further comprising a first free retention end angled relative to the longitudinal bending portion of the band and a fastening portion positioned in the second groove of the peg with a second free end directed away from the first free retention end; and wherein a distance, measured horizontally, between the second portion of the first groove and the second groove at a deepest point, which coincides with a minimum thickness of the peg body between the first groove and the second groove, is greater than a smallest distance, measured horizontally, between the bending portion of the band and the fastening portion of the band, when the band is not inserted into the first groove and the second groove, such that force is needed to separate the bending portion of the band and the fastening portion of the band in order to insert the bending portion of the band and the fastening portion of the band into the respective first groove and second groove, thereby creating a pinch effect once inserted.

2. The device according to claim 1, wherein the second groove comprises a cavity which is deeper than that of the second groove that houses the fastening portion of the band, delimiting a contact surface between the band and a surface of said cavity, which immobilizes the band relative to the peg and vice versa.

3. The device, according to claim 2, wherein the fastening portion is formed by a curved portion and a straight portion which are supported at the bottom of the cavity of the second groove of the peg.

4. The device, according to claim 2, wherein:
the first free retention end of the band extends outwardly away from the peg body when the band is inserted in the first groove;
wherein the band has a third curved portion that joins the longitudinal bending portion and the fastening portion together and allows temporary elastic relative displacement of the bending portion of the band and the fastening portion of the band; and
wherein the fastening portion is shaped to have a first inclination towards the bending portion, the second groove correspondingly shaped with an opposing surface so that, once the band is inserted with the fastening portion in the second groove, the opposing surface of the second groove prevents the peg from coming out from between the first free retention and the second end of the band or prevents the band from moving relative to the peg.

5. The device according to claim 1, wherein the peg has a free space in the first upper portion, which decreases in depth, thus allowing the bending portion of the band to oscillate between at least two positions, a first mounting position and a second dismounting position.

6. The device according to claim 1, wherein the peg body has a third groove at the lower end of the peg, the third groove joins the first groove and the second groove together.

7. The device, according to claim 6, wherein the band has a third curved portion that is introduced into the third groove of the peg.

8. The device, according to claim 1, wherein the peg body has a wedge shaped section.

9. The device, according to claim 1, wherein at least one groove of the peg has a recess for fixing the position of the band relative to said groove and by proxy relative to the peg.

10. The device, according to claim 1, wherein the first free retention end of the band forms an angle of between 0° and 90° with the longitudinal bending portion.

11. The device, according to claim 1, wherein the angle between the first free retention end of the band and the bending portion is 90°.

12. The device, according to claim 1, wherein the band has a third curved portion that joins the longitudinal bending portion and the fastening portion together.

13. The device, according to claim 1, wherein the fastening portion is formed by a straight portion, parallel to the bending portion.

14. The device, according to claim 1, wherein the fastening portion is formed by a straight portion, which is inclined relative to the bending portion.

15. The device, according to claim 1, wherein the band is an element made of tempered material that is elastic.

16. The device, according to claim 1, wherein the band has a rectangular section.

17. The device, according to claim 1, wherein the band has a circular section.

18. A fastening device for coupling a male piece and a female piece, the coupling forming a channel in which the fastening device is housed, the fastening device comprises:
a peg formed by a one piece body extending in a longitudinal direction of the peg from an upper distal end of the one piece body to a lower distal end of the one piece body, the one piece body comprising a first groove on one side and a second groove on an opposite side and opposite the first groove, wherein the first groove is variable in depth and runs along the one piece body in the longitudinal direction of the peg, the first groove comprises a first upper portion which decreases in depth followed by a second lower portion that extends to the lower distal end, the one piece body further comprises a third groove at the lower distal end, the third groove joining the first groove and the second groove; and
a retainer element, which comprises a continuous band with a longitudinal bending portion in the first groove, a fastening portion in the second groove, and an intermediate U-shaped curve portion reversing direction of the band in the third groove so that the longitudinal bending portion opposes the fastening portion; and
wherein a shortest distance separating the longitudinal bending portion from the opposing fastening portion is less than a shortest distance between a minimum thickness of the one piece body between the first groove and the opposing second groove such that force is needed to elastically separate the longitudinal bending portion of the band and the fastening portion of the band in order to insert the longitudinal bending portion of the band and the fastening portion of the band into the respective first groove and second groove, thereby creating an elastic pinch effect once inserted.

* * * * *